United States Patent [19]

Martin et al.

[11] Patent Number: 4,550,625

[45] Date of Patent: Nov. 5, 1985

[54] ELECTRICALLY CONTROLLED SHIFT ACTUATOR

[75] Inventors: George Martin, Lancaster, Ky.; Robert H. Broucksou, Portage, Mich.

[73] Assignee: Eaton Corporation, Cleveland, Ohio

[21] Appl. No.: 423,921

[22] Filed: Sep. 27, 1982

[51] Int. Cl.$^4$ .................... F16H 5/06; B60K 20/10
[52] U.S. Cl. .................... 74/335; 74/337.5; 192/109 A
[58] Field of Search ......... 74/55, 335, 337.5, 470, 74/473; 192/3.55, 48, 91, 93, 143, 109 A; 318/273, 275, 261, 264, 265, 266, 267, 466, 468

[56] References Cited

U.S. PATENT DOCUMENTS

| | | | |
|---|---|---|---|
| 1,720,989 | 7/1929 | Ahlm | 74/470 X |
| 2,600,568 | 6/1952 | Nelson | 318/468 X |
| 2,634,622 | 4/1953 | Cripe | 74/335 |
| 2,684,739 | 7/1954 | Hasbrouck | 192/109 A X |
| 2,695,531 | 11/1954 | Thomas et al. | 74/335 X |
| 3,008,342 | 11/1961 | Brunot | 74/473 |
| 3,132,531 | 5/1964 | Boughner | 74/335 |
| 3,593,084 | 7/1971 | Dalton | 318/261 |
| 3,836,832 | 9/1974 | Von Koch | 318/265 |
| 4,323,827 | 4/1982 | Young et al. | 318/446 X |
| 4,365,188 | 12/1982 | Walter | 318/468 X |
| 4,428,248 | 1/1984 | Broucksou et al. | 74/335 |
| 4,449,416 | 5/1984 | Huitema | 192/109 A X |

Primary Examiner—George H. Krizmanich
Assistant Examiner—Dirk Wright
Attorney, Agent, or Firm—C. H. Grace; A. E. Chrow

[57] ABSTRACT

In an electrically controlled shift actuator (110, 120, 130) and a control system (140) therefor of the type utilizing a cam or scotch yoke flywheel adapted to move a shift member (28, 96) to a preselected one of at least two spaced-apart shift positions. In one embodiment the shift member is in a preloaded condition provided by coiled spring (84) associated with the actuator. The control system employs a circuit having a control switch (100), a first switch (108), and a second switch (112) interconnectable in such a manner that a cam (70) responsive to the rotational position of the motor is able to change the condition of the first and second switching in a prescribed manner to move the shift member. The control system preferably includes energy dissipating resistor (120) for dynamically braking the motor and speed indicator (124) when the actuator is used as a shift actuator for a vehicle.

31 Claims, 18 Drawing Figures

ELECTRICALLY CONTROLLED SHIFT ACTUATOR

INTRODUCTION

This invention relates generally to an electrically controlled shift actuator and an electrical control system therefor and more particularly to a shift actuator, preferably a gear shift actuator for an axle, of the type utilizing a rotational member to position a shift member engagement means at each of at least two spaced-apart shift positions to effect the shift thereat or to position and preload the shift member engagement means at each of at least two spaced-apart shift positions sufficiently to effect the shift upon the occurrence of an event enabling the shift to occur.

BACKGROUND OF THE INVENTION

Shift actuators, such as two-position shift actuators, for selectively shifting, or positioning, a shifting mechanism, such as a shift fork or the like are well known in the prior art. Shift actuators allowing a shift to each of at least two preselected positions by preloading an element, usually a resilient element such as a spring, to bias the shift element, usually a shift fork or the like, towards each of the two preselected positions are also well known in the art. Examples of the latter devices are disclosed respectively in U.S. Pat. Nos. 2,754,692; 2,821,089 and; 3,358,517, the disclosures of which are incorporated herein by reference.

The present invention relates to the control of shift actuators of the type utilizing a rotational member for moving a shift member engagement means between at least two spaced-apart shift positions including the shift actuator disclosed in U.S. Pat. No. 4,428,248 issued Jan. 31, 1984, and assigned to the assignee of the present invention, the disclosure of which is included herein by reference.

Although shifting actuators of the type utilizing a rotational member described above may be used to advantage, a need has existed for providing a simple and low cost method of effective control.

SUMMARY OF THE INVENTION

Accordingly, it is an object of this invention to provide a shift actuator of the type using a rotational member to move a shift member engagement means selectively between at least two spaced-apart shift positions that is controlled simply and effectively in an inexpensive manner.

It is another object of this invention to provide a shift actuator of the type using a rotational member to position and preload a shift member engaging means at each of at least two preselected spaced-apart shift positions that is controlled simply and effectively in an inexpensive manner.

It is yet another object of this invention to provide a simple and inexpensive control for effectively controlling a shift actuator of the type using a rotational member to selectively position a shift member engagement means at each of at least two preselected spaced-apart shift positions including shift actuators that additionally enable preloading of the shift member engagement means at the shift positions sufficient to effect the shift thereat upon the occurrence of an event enabling the shift to occur.

BRIEF DESCRIPTION OF THE DRAWINGS

FIG. 1A shows a plan view of a layout of an embodiment of the rotational member of the shift actuator of FIG. 1 in the form of a cam;

FIG. 3 shows a perspective view of rotational member of the shift actuator of FIG. 3 in the form of a scotch yoke flywheel having a scotch yoke pin displaced a radial distance "R" from the central rotational axis of the flywheel;

DESCRIPTION OF THE PREFERRED EMBODIMENT

Figure 1:
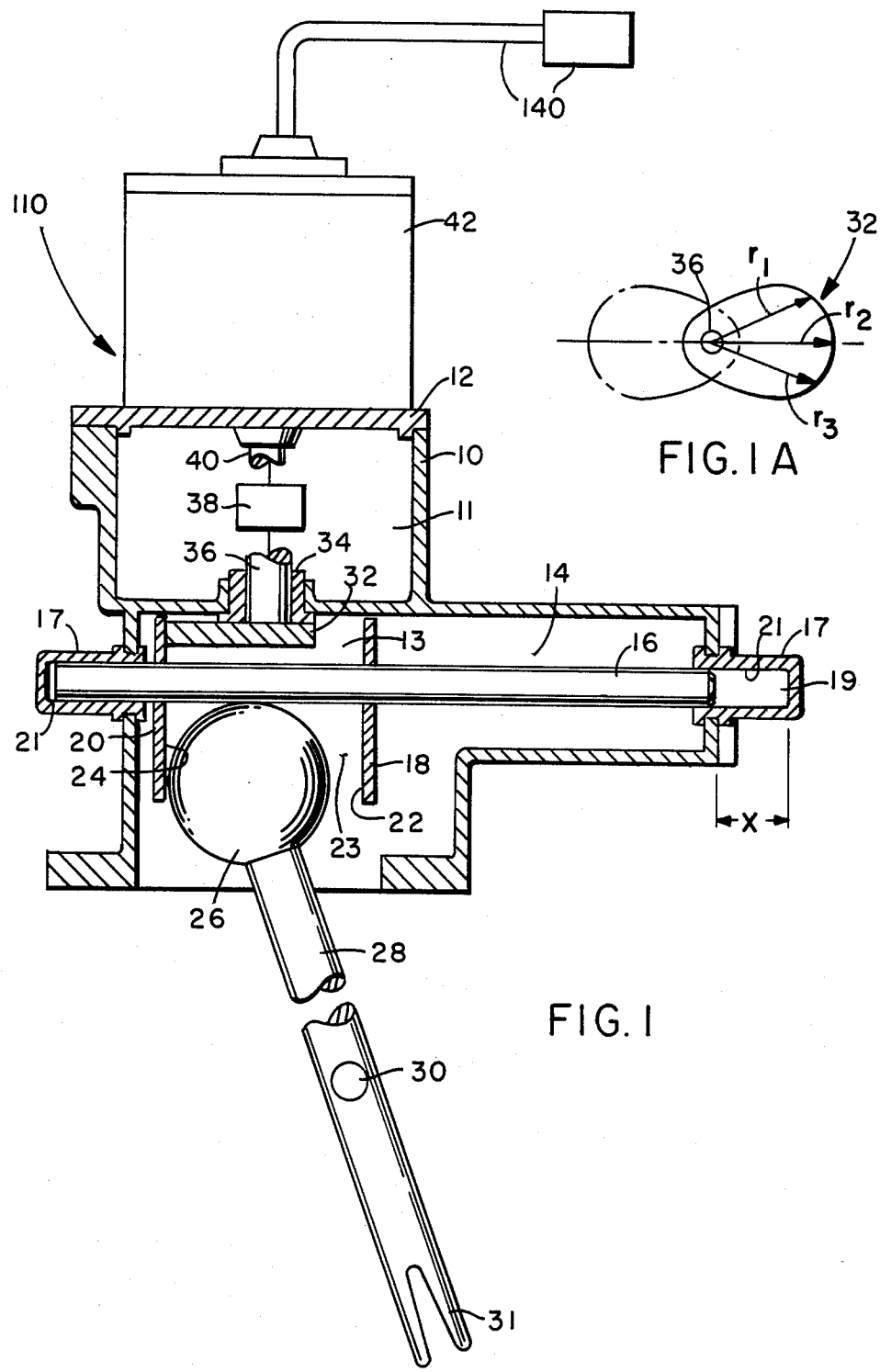
FIG. 1 shows a partial cross-sectional side elevation view of an embodiment of a shift actuator of the invention.

FIG. 1 shows an embodiment of the controlled shift actuator of the invention in the form of actuator 110. Actuator 110 has a housing 10 having a removable top 12. Housing 10 encloses cavity 11 and cavity 14 as shown in FIG. 1. Housing 10 may be a one-piece construction or may comprise multiple components that are secured together by suitable fasteners, not referenced. Slide shaft 16 is moveably mounted on housing 10 within cavity 14 by being slidably engaged with the inner surface 21 of axially aligned components 17 secured on opposite sides of housing 10 as shown in FIG. 1. The inner surface 21 of each component 17 encloses an open-end cavity 19 communicating with cavity 14. In the position of shaft 16 shown in FIG. 1, shaft 16 is able to slide a distance "X" toward the viewer's right within cavity 14 and cavity 19. It is to be understood that the manner in which shaft 16 is moveably mounted as housing 10 of FIG. 1 is for illustrative purposes only and that any suitable means of moveably supporting shaft 16 on housing 10 may be used and fall within the scope of the invention.

Members 18 and 20 are fixedly secured to shaft 16 by welding or other suitable means in a spaced-apart relationship as shown in FIG. 1. Although members 18 and 20 are each preferably in the form of a flange as shown in FIG. 1, they may have any shape provided they function in the manner hereinafter described. Members 18 and 20 have facing surfaces 22 and 24 that face each and define a space 23 therebetween. Shaft 16 and at least a portion of members 18 and 20 and space 23 define the shift member engagement means of actuator 110. Understandably, other shift member engagement means other than members 18 and 20 and space 23 therebetween may be associated with shaft 16. As shown in FIG. 1, movement of shaft 16 the distance "X" towards the viewer's right will cause surface 24 of member 20 to impinge upon spherical end 26 of shift member 28 disposed in space 23 and cause member 28 to pivot about pivot 30 and cause forked end 31 of member 28 to rotate towards the viewer's left. Forked end 31 may, for example, be engaged with a shift rail for shifting a clutch to engage a gear in response to such rotation. Likewise, movement of shaft 16 toward the viewer's left a distance "X" (as shown in FIG. 1) will cause surface 22 of member 18 to impinge on spherical end 26 and cause member 28 to rotate counter clockwise about pivot 30 and move forked end 31 of member 28 to the viewer's right to the position shown in FIG. 1. Although member 28 is shown in the form of a pivotably mounted fork commonly used to shift from one gear to another, member 28 may be any type of a shift member that can accomplish or be prepared to accomplish a shift function at each of at least two spaced-apart shift positions in response to the movement of the shift member engagement means in the manner described.

Rotatable member 32 is rotatably mounted on housing 10 by means of rotatable shaft 36 that is rotatably mounted in bushing or bearing 34. Shaft 36 extends between cavity 14 and cavity 11 of housing 10. Shaft 36 is drivingly coupled with gear reduction means 38 which in turn is drivingly coupled with rotatable shaft 40 of motor 42. Motor 42 rotates shaft 36 and rotatable member 32 by means of a control 140 hereinafter described with respect to FIGS. 7A-7C, 8A-8C, 9 and 10. Although, shafts 36 and 40 are shown in FIG. 1 as being axially aligned in a direction substantially transverse to the central longitudinal axis of shaft 16, such is for illustrative purposes only for any positional arrangements between motor 42 and shaft 16 may be used provided rotation of member 32 causes shaft 16 to move the distance "X" towards the viewer's right and left as hereinbefore described. Likewise, other intermediate componentss between shaft 40 of motor 42 and shaft 36 such as a worm gear or other driving components may be used in place of or in addition to reducer 38 where suitable.

Rotational member 32 is any rotational member whose rotational position relative housing 10 and shaft 40 of motor 42 is able to cause the shift member engagement means of actuator 110 to move to each of at least two spaced-apart shift positions. Preferably, member 32 is a cam such as shown in FIG. 1A having one end mounted on shaft 36 and the opposite end arcuately shaped according to radii of curvature "$r_1$", "$r_2$" and "$r_3$" as shown in FIG. 1A.

The means for moving shaft 16 is defined as the member 18 and member 20 and space 23 therebetween. Member 32 is disposed in space 13 and is dimensionally adapted, such that upon rotating to the position shown in solid line in FIG. 1, member 32 will impinge upon at least a portion of surface 22 of member 18 and cause shaft 16 to move the distance "X" toward the viewer's right to a first shift position and rotation of member 32 to the position shown in dashed line in FIG. 1A which is 180° from the solid position will cause member 32 to impinge upon surface 24 of member 20 and move shaft 16 the distance "X" towards the viewer's left to a second shift position that for actuator 110 is axially opposite to the first shift position. In FIG. 1, member 32 is in the dashed line position shown in FIG. 1A. Although actuator 110 shows a preferred embodiment of the shift actuator of the invention controlled by a control hereinafter described with respect to FIGS. 7A-7C, 8A-8C, 9 and 10, other arrangements where the shift member engagement means is not part of a shaft subject to opposite axial movement in response to rotation of rotational member 32 are considered within the scope of the invention for in the broad sense the actuator comprises a housing, a rotational member rotatably mounted in the housing, a shift member engagement means and a means for moving the shift member engagement means to each of at least two spaced-apart shift positions in response to the rotation of the rotational member to each of at least two rotational positions relative the housing.

Figure 2:
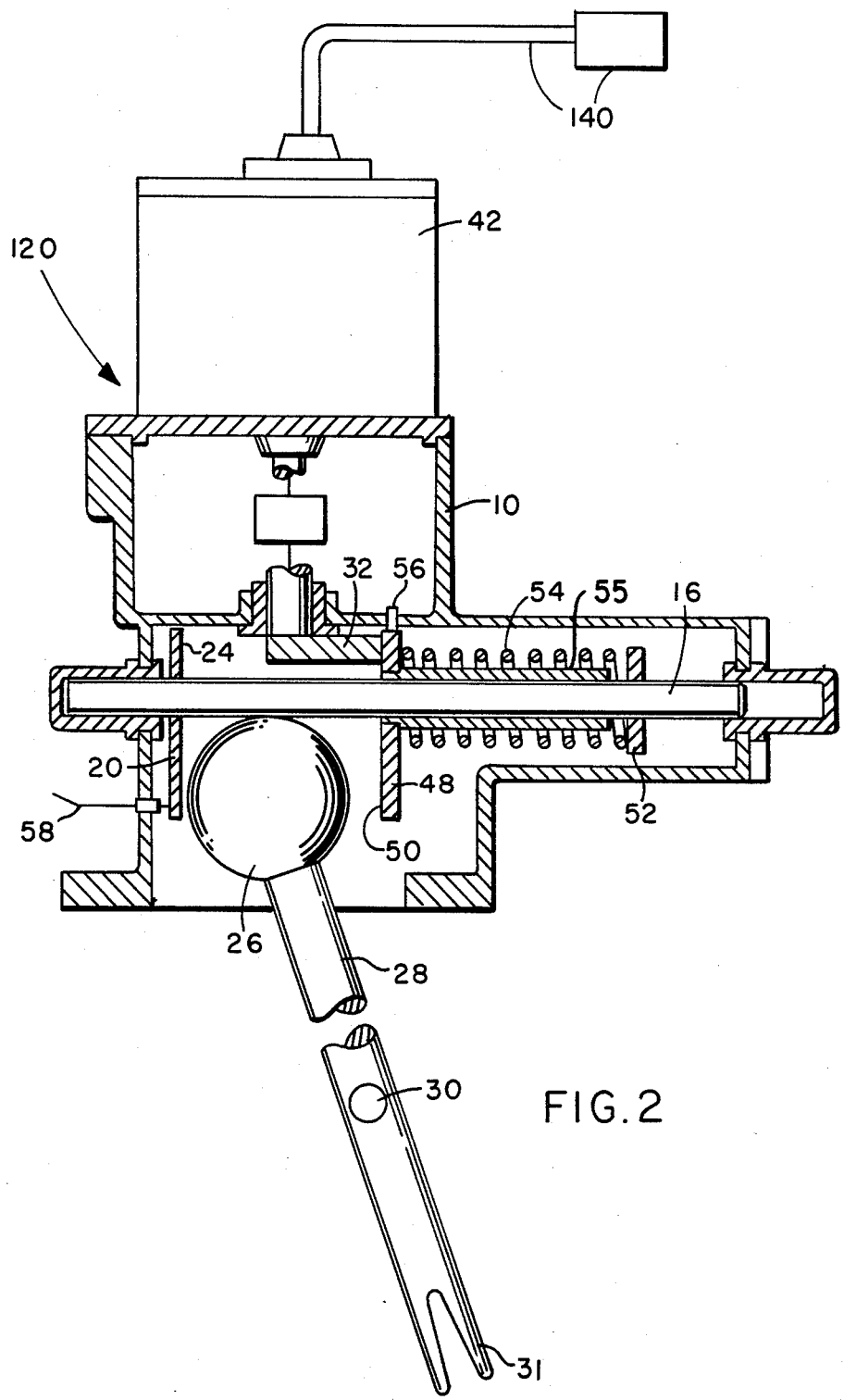
FIG. 2 shows a partial cross-sectional side elevation view of another embodiment of the shift actuator of the invention.

FIG. 2 shows an embodiment of the controlled shift actuator of the invention in the form of actuator 120 controlled by control 140 hereinafter described with respect to FIGS. 7A-7C, 8A-8C, 9 and 10. Actuator 120 has a housing 10, a rotatable member 32 that is drivingly connected to motor 42 and rotated thereby, a shaft 16, a member 20 having inner surface 24, and a shift member 28 that, for illustrative purposes, is pivotably mounted at pivot 30 and has a spherical end 26 and an opposite forked end 31. The movement of shaft 16 in response to the rotation of rotational member 32 is substantially the same as previously described for actuator 110 of FIG. 1 excepting that member 21 has been replaced with member 52, such as a flange or the like, secured to shaft 16 as shown in FIG. 2. Member 48, in the form of a flange or the like, is slidably mounted on shaft 16. Member 48 is spaced-apart from member 52. Member 55 is secured to member 50 and is slidably engaged with shaft 16 to provide a support for resilient biasing means 54 which, for the embodiment of actuator 120 shown in FIG. 2, is preferably in the form of at least one coiled spring disposed coaxialy about member 55 and shaft 16. Member 48 comprises a reaction member whose surface 50 when acted upon by rotational member 32 in the rotational position shown in FIG. 2 causes member 48 to press against resilient biasing means 54 and causes resilient means 54 to press against member 52 to urge shaft 16 toward the viewer's right to a first shift position in a preloaded condition such that the shift may be accomplished by the occurrence of an event enabling the shift to occur such as engaging a clutch or releasing an accelerator pedal. When rotational member 32 is in the form of a cam shown in FIG. 1A, rotation of the cam 180° will cause the arcuate end of the cam to press against surface 24 of member 20 and move shaft 16 toward the viewer's left and member 52 will compress biasing means 54 against member 48 so as to create a preloaded condition enabling the shift to occur at the second shift position upon the occurrence of an event such as engaging a clutch or releasing an accelerator pedal. Also shown in FIG. 2 are micro-switches 56 and 58. One or more of such switches may be included in all embodiments of the controlled actuator of the invention when desired for some functional purpose. Actuator 120 illustrates that a reaction member and biasing means may be included in actuators controlled by the control hereinafter described with respect to FIGS. 7A–7C, 8A–8C, 9 and 10 to position the shift member engagement means in a preloaded condition of each of the shift positions associated with the particular actuator.

Figure 3:
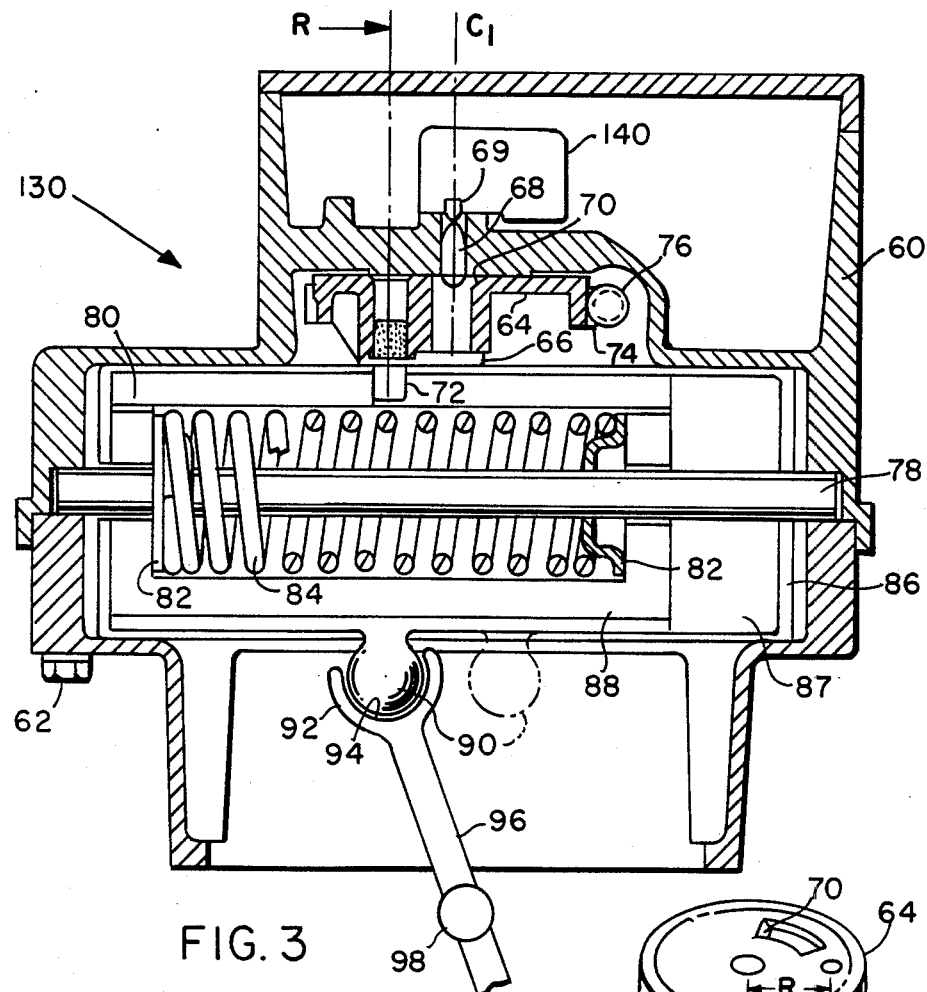
FIG. 3 shows a partial cross-sectional side elevation view of another embodiment of the shift actuator of the invention.

FIG. 3 shows an embodiment of the controlled shift actuator of the invention in the form of actuator 130. Actuator 130, is adapted to place the shift member engagement means in a preloaded condition.

Actuator 130 has a housing 60 enclosing a cavity 87 in which slide shaft 78 is supported as shown in FIG. 3. Reaction member 80 is slidably disposed on shaft 78 and able to slide in opposite axial directions therealong. Shift member engagement means in the form of spherical ball 90 is part of slide member 88 and is likewise able to slide in opposite axial directions along shaft 78. Resilient biasing means 84, preferably in the form of at least one coiled spring, is disposed coaxially about shaft 78 and is supported at its opposite ends by mounting means or spring seat 82. Shift member 96 is pivotably mounted at pivot 98 and has an end 94 that coacts with member 90 to rotate member 96 about pivot 98 such as when member 90 moves into the dashed position shown. Member 92 has an arcuate shaped end 92 having an open-ended arcuate shaped surface 94 that is adapted to enclose at least a portion of member 90. Housing 60 may be of multiple piece construction whose parts are held together by suitable fasteners such as bolt 62 shown for illustrative purposes.

Movement of shift member engagement means comprising slide member 88 and ball 90 to each of at least spaced-apart first and second shift positions positioned respectively to the viewer's right or left and correspondly act upon member 96 to rotate member 96 about pivot 98 to position the opposite end of member 96 at the respective shift positions in a preloaded condition and effect the shift upon the occurrence of an event as previously described for such actuator types.

Figure 4:
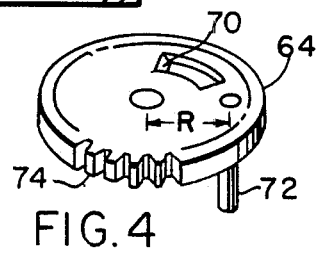
Figure 5A:
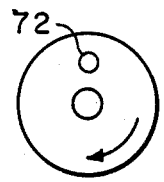
FIGS. 5A–5D show plan views of different rotational positions of the flywheel of FIG. 4.
Figure 5C:
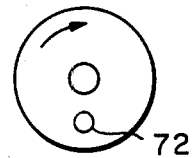
Figure 5B:
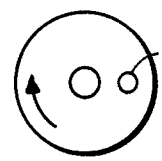
Figure 5D:
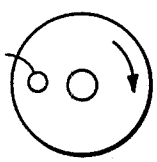

Rotatable member 64 in the form of a scotch yoke flywheel shown in FIG. 4 is rotatably mounted to housing 60 by means of pin 66. Pin 66 is secured to housing 60 by suitable means. Pin 66 may be rotatably mounted to housing 60 in which case flywheel 64 is suitably secured to pin 66 so that it is able to rotate therewith.

Flywheel 64 has a scotch yoke pin 72 which extends downwardly into cavity 87 and is adapted to engage with reaction member 80. Pin 72 is displaced a radial distance "R" from central rotational axis "C," of flywheel 64. Rotation of flywheel 64 causes pin 72 to rotate about axis "C," and move reaction member 80 in opposite axial directions along shaft 78 depending on the rotational position of pin 72. Various rotational positions of pin 72 are shown in FIGS. 5A–5D. Commonly, rotational positions of pin 72 that are 180° apart are used where it is desired to move reaction member 80 to first and second shaft positions that are disposed in opposite directions from each other. As with actuator 120, movement of reaction member 80 in either direction along shaft 78 causes member 80 to press against mounting means 82 and compress resilient biasing means 74 which in turn urges slide member 88 and ball 90 to each of at least two spaced-apart shift positions in a preloaded condition as previously described.

Flywheel 64 has gear teeth 74 disposed circumferentially about its outer peripheral edge that are adapted to engage with gear teeth 74 of worm gear 76. Worm gear 76 is journaled for rotation and drivingly connected to a motor, not shown, and rotated thereby in response to the control hereinafter described with respect to FIGS. 7A–7C, 8A–8C, 9 and 10. As for all embodiments of the controlled actuator of the invention, the rotatable member such as cam 32 of actuator 110 or the scotch yoke flywheel 64 of actuator 130 may have shift positions intermediate the extreme shift positions represented by 180° rotation of the rotatable member such as provided by the intermediate shift positions resulting from the rotational positions of flywheel 62 shown in FIGS. 5A–5D.

Figure 6:
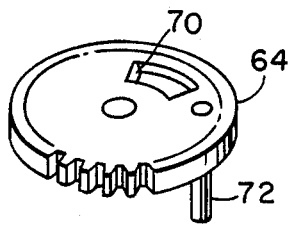
FIG. 6 shows a perspective view of the flywheel of FIG. 3 having a cam surface for providing the means of conditioning the control of the actuator of the invention.

Cam follower 68 in the form of a pin or other suitable shape is slidably engaged through an opening through the wall of housing 10, not referenced, and has one end adapted to be contacted by cam 70 disposed in the upper surface of flywheel 64 as shown in FIGS. 3, 4 and 6. The opposite end of pin 68 is adapted to contact and move pin 69 of one of the switch means of control 140 to change the condition thereof in response to rotation of flywheel 64 as hereinafter more fully described with respect to FIG. 6.

FIG. 6 shows cam 70 in the upper surface of flywheel 64, as previously described. Cam 70 provides the means for changing the condition of switch means associated with control 140 as hereinafter more fully described with respect to FIGS. 7A–7C, 8A–8C, 9 and 10. It can readily be seen that as flywheel 64 is rotated by worm gear 76, pin 72 moves the shift member engagement means between the first and second shift positions as previously described while at the same time cam 70 is caused to rotate and move cam follower 68 upward and downward through an opening in the wall of housing 10 and correspondingly move an actuating pin of one of the switch means of control 140 to change the condition thereof. As hereinafter described, control 140 preferably has two switch means that are positioned so that the actuating pin 69 of each is alternately actuated and deactuated to change the condition thereof relative to the other by the reciprocal movement of cam follower 68 in response to rotation of cam 70. Understandably, a cam such as cam 70 may be included as part of the rotatable member of the controlled actuator of the invention whether the rotatable member itself be in the form of a cam such as cam 32 of actuators 110 and 120.

Although it is preferred that the means for changing the condition of the switch means of control 140 be in the form of a cam that is part of the rotatable member of the actuator of the invention, other means may be employed to change the condition of the switch means such as by means of at least one cam that is part of the reaction member or shift member engagement means that is able to change the condition of the switch means in the manner desired in response to the movement thereof. Likewise, the means for changing the condition of the switch means of control 140 may be by means of at least one cam that is rotatably mounted on the housing separate from the rotatable member and rotated directly or indirectly by the motor means used to rotate the rotatable member.

FIGS. 7A–7C, 8A–8C, 9 and 10 show control 140 that has been found to provide a simple and inexpensive means of controlling rotation of the rotational member of a shift actuator such as actuators 110, 120 and 130 previously described.

Control 140 comprises a motor "M", referenced 118, in combination with first switch means 106, second switch means 112 and third switch means 100. Motor "M" is the motor drivingly connected to the rotatable member of the controlled actuator of the invention such as actuators 110, 120 and 130 that cause the rotation thereof in response to rotation of the rotational shaft of the motor. Although first switch means 106 and second switch means 112 are shown as separate switch means in FIGS. 7a–8C, 8A–8C, 9 and 10, it is to be understood that a single switch means able to provide the function of the first and second switch means as described herein is considered within the scope of the invention.

Third switch means 100 is the control switch used to position the shift member engagement means at each of at least two shift positions as previously described. Third switch means 100 may for example be conveniently located in the cab of a motor vehicle remotely from the shaft actuator such as where the shift actuator is a gear shift actuator adapted to enable shifting between low and high gears of the vehicle axle. For the embodiment of the control in the form of control 140 only two shift positions are involved. Third switch means 100 is connectable to a source of power and has a first condition 102 and a second condition 104. For the embodiment of control 140 shown, the word "condition" refers to a selectable condition of the switch means as is the case with respect to switch means 1 and 2. The word "condition" includes positioning a component of the particular switch means at a first or second position such as where condition 1 of first switch means 106 and condition 2 of second switch means 112 is a normally closed position and the second condition of first switch means 106 and the first condition of second switch means 112 is a normally open position.

First switch means 106 is connectable to motor "M" and to third switch means 100 and has a first condition 108 and a second condition 110. Second switch means 112 is connectable to motor "M" and to third switch means 100 and has a first condition 116 and a second condition 114. The relationship between the respective switch means conditions determines the manner of control of motor "M" which in turn determines the rotational position of the rotatable member previously described. The relationship between the conditions of first switch means 106 and second switch means 112 is determined by the rotational position of the shaft of motor "M".

Figure 7A:
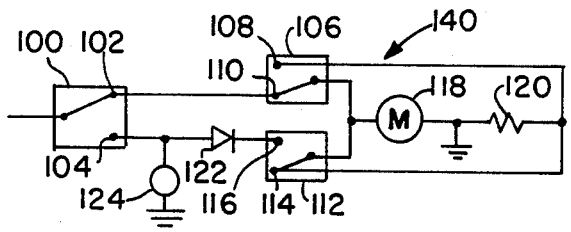
FIGS. 7A–7C show a schematic view of the sequential steps associated with the control of the shift actuator of the invention in moving the shift member engagement means to a first shift position.
Figure 7B:
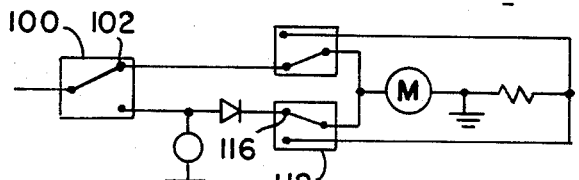
Figure 7C:
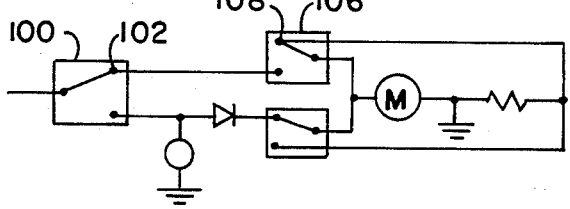

In FIGS. 7A–7C, third switch means 100 is placed in first condition 102, first switch means 106 is in second condition 110 and second switch means 112 is in second condition 114 enabling power to be delivered to motor "M" to start the rotation thereof and cause the shift member engagement means to move to the first shift position. The condition of first switch means 106 and second switch means 112 are changed relative to each other preferably by means of a single cam that is rotated directed or indirectly by motor "M" and more preferably by a cam that is a part of the rotatable member of the shift actuator of the invention as previously desired. First switch means 106 and second switch means 112 may also have their respective condition changed relative to each other as described herein by means of a cam separate to each that is driven directly or indirectly by motor "M". Motor "M" is preferably a unidirectional electric motor and more preferably a D.C. unidirectional electrical motor. The rotational speed of the shaft of motor "M" when connected to a power source is selected to fit the circumstances involved and may include speed reduction means as previously described such as a speed reductor of 30 or 40 to one where the rotational speed of the motor shaft is 3000 revolutions per minute. The condition of first switch means 106 and second switch means 112 and the relationship therebetween is determined by the means responsive to the rotation of the shaft of motor "M" such as the cam previously described with respect to FIG. 6. In the sequence of operations for moving the shift member engagement means to the first shift position, second shift means 112 is changed to the first condition 116 as shown in FIG. 7B and, when the shift member engagement means is at the first shift position, first switch means 106 is changed to the first condition 108 as shown in FIG. 7C to stop the motor from rotating.

Figure 8A:
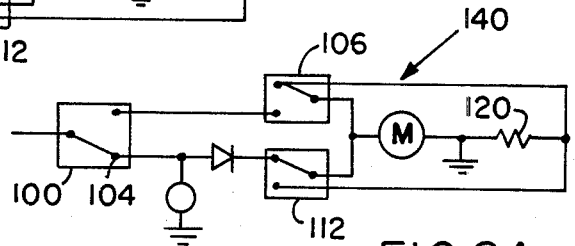
FIGS. 8A–8C show a schematic view of the sequential steps associated with the control of the shift actuator of the invention in moving the shift member engagement means to a second position spaced-apart from the first shift position referred to with respect to FIG. 7C.
Figure 8B:
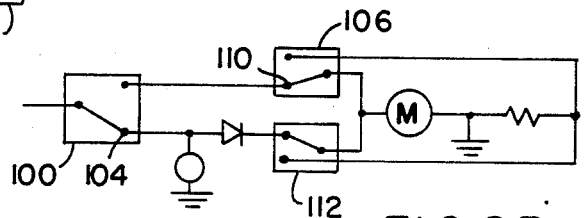

In FIG. 8A third switch means 100 is changed to the second condition to start rotation of motor "M" to move the shift member engagement means from the first shift position to the second shift position. The condition of first switch means 106 and second switch means 112 is initially the same as shown in FIG. 7C. In FIG. 8B, first switch means 106 is changed to second condition 110 to enable second switch means 112 to deliver power to motor "M" for the rotation of the shaft thereof and in FIG. 8C, second switch means 112 is changed to second condition 114 to stop the shaft of motor "M" from rotating when the shift member engagement means is at the second shift position.

Thus, control 140 provides a control system involving three switch means of which one is a control switch means and the other two are placed in the condition described by means of a member responsive to the rotational position of the motor shaft with their respective condition synchronized with the particular rotational position of the rotational member of the shift actuator relative the housing. Although control 140 preferably uses separate first and second switch means in conjunction with a control switch means as previously described, the first and second switch means may be combined into a single switch means provided the combination provides the functions required.

Figure 9:
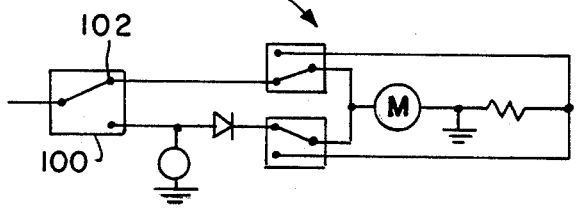
FIG. 9 shows a schematic view of the control shown in FIG. 8C showing the manner in which the shift member engagement means may be returned to the first shift position without the shift having occurred at the second shift position.
Figure 10:
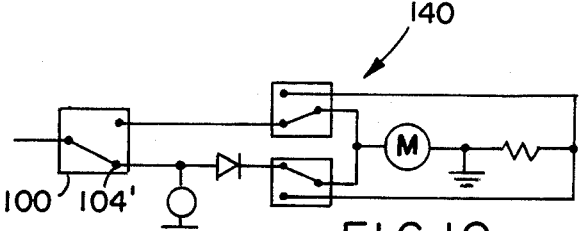
FIG. 10 shows a schematic view of the control shown in FIG. 7C showing the manner in which the shift member engagement means may be returned to the second shift position without the shift having occurred at the first shift position.

FIG. 10 shows that an operator may change his mind and change first condition 102 of third switch means 100 of FIG. 7B to second condition 104 and thereby commence returning the shift member engagement means to the second shift position from the first shift position at any time prior to shifting at the first shift position. FIG. 9 shows that third switch means 100 may be changed from second position 104 shown in FIG. 8B to first condition 102 to return the shift member engagement means from the second shift position to the first shift position at any time prior to shifting at second shift position.

Figure 8C:
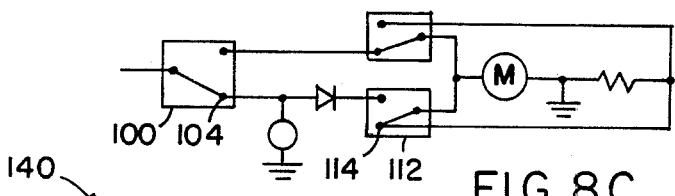

Control 140 may further include energy dissipation means for dynamically braking motor "M". A preferred means is where a resistor 120 is connected to motor "M" in the manner shown in the FIGURES to absorb energy in the form of heat when the first, second and third switch means are all in the first condition as shown in FIG. 7C and when the first, second and third switch means are all in the second condition as shown in FIG. 8C and to prevent shorting motor "M" when the first, second and third switch means are in the condition shown respectively in FIGS. 7B and 8B.

Control 140 may further include unidirectional current directing means such as rectifier 122 selected for the particular application where it is desired to prevent current from returning from second switch means 112 to third switch means 100 when the switch means are in the condition shown in FIG. 7B. Such unidirectional current control is particularly advantageous, for example, where the shift actuator is a gear shift actuator associated with a motor vehicle and a speed indicating means 124 is included along with a scaling circuit to measure ground speed of the vehicle when the third switch means is in the second condition as shown in FIGS. 8A–8C.

The controlled shift actuator of the invention may be made from any material or materials suitable for a particular application. Commonly, the controlled shift actuator of the invention is a gear shift actuator in which a shift is required to a first gear engageable at the first switch position to a second gear engageable at the second shift position by means of the shift member means being activated by the movement of the shift member engagement means to the first and second shift positions as described herein.

Even more commonly, the first gear may be a low speed gear and the second gear a high speed gear such as associated with the axle of a motor vehicle.

What is claimed is:

1. A shift actuator responsive to an electrical control for selectively moving a shift member engagement means between a selected one of at least two spaced-apart first and second shift positions, said actuator of the type comprising a housing, a rotatable member rotatably mounted on the housing and having at least a first and second rotational position relative to the housing respectively corresponding to the first and second shift positions, and means moveable with respect to the housing having means associated therewith for moving the shift member engagement means to the first and second shift positions in response to rotation of the rotatable member respectively to the first and second rotational positions, said control comprising:
   a motor operable to rotate the rotatable member between the first and second rotational positions thereof relative the housing;
   first switch means connected to the motor, said first switch means having a first condition and a second condition;
   second switch means connected to the motor and to the first switch means, said second switch means having a first condition and a second condition;
   third switch means connected to a power supply and to said first and second switch means, said third switch means having a first condition for directing power from the power supply to the motor when the first switch means is in the second condition and the second switch means is in either the first or second condition and having a second condition for directing power from the power supply to the motor when the second switch means is in the first condition and the first switch means is in either the first or second condition;
   and said rotatable member comprising a cam operable to control the relative conditions of said first, second and third switch means such that said third switch means is in the first condition and said first and second switch means are respectively in said second condition when the shift member engagement means is at the second shift position and to change said second switch means to said first condition to start the motor rotating to move the shift member engagement means to the first shift position and to then change said first switch means to said second condition to stop the motor from rotating and change said first switch means to said first condition and said third switch means to said first condition when the shift member engagement means is at the first shift position and to then change said first switch means to said second condition to start the motor rotating to move the shift member engagement means to the second shift position and to then change the second switch means to the second condition to stop the motor from rotating when the shift member engagement means is at the second shift position.

2. The shift actuator of claim 1, including energy dissipating means connectable to the motor for dynamically braking the motor.

3. The shift actuator of claim 2, wherein the energy dissipating means is operable to dynamically brake the motor when the first, second and third switch means are all in the first condition and when the first, second and third switch means are all in the second condition.

4. The shift actuator of claim 3, wherein the energy dissipating means is a resistor adapted to prevent the motor from shorting.

5. The shift actuator of claim 1, including unidirectional current directing means adapted to prevent current from returning to the third switch means when the second and third switch means are in the first condition and the first switch means is in the second condition.

6. The shift actuator of claim 5, wherein the unidirectional current directing means is a rectifier.

7. The shift actuator of claims 1 or 5, including speed indicating means for providing an indication of ground speed of a vehicle associated with the shift actuator.

8. The shift actuator of claim 1, wherein the cam is a scotch yoke flywheel, said flywheel having a scotch yoke pin mounted thereto at a radial distance from the rotational axis of the flywheel and adapted to act upon the means for moving the shift member engagment means and cause the movement thereof to the first shift position in response to rotation of the pin to the first rotational position relative the housing and cause the movement thereof to the second shift position in response to rotation of the pin to the second rotational position relative the housing.

9. The shift actuator of claim 1, wherein the means associated with the shift member engagement means for the movement thereof comprises a shaft mounted in the housing and axially moveable relative thereto for a distance sufficient to move the shift member engagement means to the first and second shift positions, a pair of spaced-apart members secured to the shaft and adapted to be acted upon by the rotational member and cause the shift member engagement means to move to the first shift position in response to rotation of the rotational member to the first rotational position thereof and cause the shift member engagement means to move to the second shift position in response to the rotational member to the second rotational position thereof.

10. The shift actuator of claim 8, wherein the shift member engagement means comprises at least a portion of the facing surface of the spaced-apart members and the space defined therebetween.

11. The shift actuator of claim 1, wherein the means for moving the shift member engagement means comprises a reaction member and at least one resilient biasing means disposed between the reaction member and the shift member engagement means, said reaction member adapted to be acted upon by the rotational member and cause the biasing menas to urge the shift member engagement means to the first shift position in a preloaded condition in response to rotation of the rotational member to the first rotational position relative the housing and cause the biasing means to urge the shift member engagement means to the second shift position in preloaded condition in response to rotation of the rotational member to the second rotational position relative the housing, said preloaded condition at the first and second shift position sufficient to enable the shift member engagement means to effect the shift upon the occurrence of an event enabling the shift to occur.

12. The shift actuator of claim 11, wherein the reaction member is slidably disposed within the housing and the shift member engagement means is part of a slide member that is slidably disposed within the housing.

13. The shift actuator of claim 12, wherein the reaction member and the slide member are both caused to slide in the same direction when the reaciton member is acted upon by the rotational member.

14. The shift actuator of claim 13, wherein the reaction member and the slide member are both caused to move in the same direction by being slidably mounted upon a shaft secured within the housing such that the reaction member is caused to slide in a direction axially along the shaft and cause the biasing means to urge the slide member in the same axial direction along shaft in response to rotation of the rotational member to the first rotational position relative the housing and such that the reaction member is caused to slide in a direction axially along the shaft and cause the biasing means to urge the slide member in the same axial direction along the shaft in response to rotation of the rotational member to the second rotational position relative the housing.

15. The shift actuator of claim 14, having only a first and a second shift position positioned such that the axial direction of movement of the reaction member along the shaft towards the first shift position is opposite to the axial direction of movement of the reaction member along the shaft towards the second shift position.

16. The shift actuator of claim 1, wherein the first rotational position of the rotational member relative the housing is 180° from the second rotational position thereof relative the housing.

17. The shift actuator of claim 11, having only a first shift position and a second shift position positioned such that the direction of movement of the reaction member towards the first shift position is opposite to the direction of movement of the reaction member towards the second shift position.

18. The shift actuator of claim 11, wherein the biasing means is a coiled spring.

19. The shift actuator of claim 1, wherein the shift actuator is a gear shift actuator enabling shifting to a first gear at the first shift position and shifting to a second gear at the second shift position.

20. The shift actuator of claim 19, wherein the gear shift actuator is a gear shift actuator of a component of a vehicle.

21. The shift actuator of claim 20, wherein the component is an axle.

22. A control for controlling a shift actuator for selectively moving a shift member engagement means between a selected one of at least two spaced-apart first and second shift positions of the type comprising a housing, a rotatable member rotatably mounted on the housing and having at least a first and second rotational position relative the housing respectively corresponding to the first and second shift positions, and means moveable with respect to the housing having means associated therewith for moving the shift member engagement means to the first and second shift positions in response to rotation of the rotatable member respectively to the first and second rotational positions, said control comprising:

a motor operable to rotate the rotatable member between the first and second rotational positions thereof relative the housing;

first switch means connected to the motor, said first switch means having a first condition and a second condition in which said first switch means is adapted to supply power to the motor to effect the rotation thereof;

second switch means connected to the motor and to the first switch means, said second switch means having a first condition and a second condition;

third switch means connected to a power supply and to said first and second switch means, said third switch means having a first condition for directing power from the power supply to the motor when the first switch means is in the second condition and the second switch means is in either the first or second condition and having a second condition for directing power from the power supply to the motor when the second switch means is in the first condition and the first switch means is in either the first or second condition;

and said rotatable member comprising a cam operable to control the relative conditions of said first, second and third switch means such that said third switch means is in the first condition and said first and second switch means are respectively in said second condition when the shift member engagement means is at the second shift position and to change said second switch means to said first condition to start the motor rotating to move the shift member engagement means to the first shift position and to then change said first switch means to said second condition to stop the motor from rotating and change said first switch means to said first condition and said third switch means to said first condition when the shift member engagement means is at the first shift position and to then change said first switch means to said second condition to start the motor rotating to move the shift member engagement means to the second shift position and then change the second switch means to the second condition to stop the motor from rotating when the shift member engagement means is at the second shift position.

23. The control of claim 22, including energy dissipating means connectable to the motor for dynamically braking the motor.

24. The control of claim 23, wherein the energy dissipating means is operable to dynamically brake the motor when the first, second and third switch means are all in the first condition and when the first, second and third switch means are all in the second condition.

25. The control of claim 23, wherein the energy dissipating means is a resistor adapted to prevent the motor from shorting.

26. The control of claim 22, including unidirectional current directing means adapted to prevent current from returning to the third switch means when the second and third switch means are in the first condition and the first switch means is in the second condition.

27. The control of claim 26, wherein the unidirectional current directing means is a rectifier.

28. The control of claims 22 or 27, including speed indicating means for providing an indication of ground speed of a vehicle associated with the shift actuator.

29. The control of claim 22, wherein the shift actuator is a gear shift actuator enabling shifting to a first gear at the first shift position and shifting to a second gear at the second shift position.

30. The control of claim 29, wherein the gear shift actuator is a gear shift actuator of a component of a vehicle.

31. The control of claim 30, wherein the component is an axle.

* * * * *